US012577349B2

(12) United States Patent
Huang et al.

(10) Patent No.: US 12,577,349 B2
(45) Date of Patent: Mar. 17, 2026

(54) POLYESTER COMPOSITION AND THE MOLDED PRODUCT THEREOF

(71) Applicant: CHANG CHUN PLASTICS CO., LTD., Taipei (TW)

(72) Inventors: Ching Jui Huang, Taipei (TW); An-Pang Tu, Taipei (TW)

(73) Assignee: CHANG CHUN PLASTICS CO., LTD., Taipei (TW)

(*) Notice: Subject to any disclaimer, the term of this patent is extended or adjusted under 35 U.S.C. 154(b) by 0 days.

(21) Appl. No.: 18/649,316

(22) Filed: Apr. 29, 2024

(65) Prior Publication Data

US 2025/0109244 A1 Apr. 3, 2025

(30) Foreign Application Priority Data

Sep. 28, 2023 (CN) ......................... 202311271957.5
Sep. 28, 2023 (TW) ................................ 112137371

(51) Int. Cl.

| | |
|---|---|
| ***C08G 63/46*** | (2006.01) |
| ***C08G 63/183*** | (2006.01) |
| ***C08G 63/199*** | (2006.01) |
| ***C08G 63/672*** | (2006.01) |

(52) U.S. Cl.

CPC ........... *C08G 63/46* (2013.01); *C08G 63/183* (2013.01); *C08G 63/199* (2013.01); *C08G 63/672* (2013.01)

(58) Field of Classification Search

CPC .... C08G 63/46; C08G 63/183; C08G 63/199; C08G 63/672
USPC .......................................................... 528/272
See application file for complete search history.

(56) References Cited

U.S. PATENT DOCUMENTS

2024/0166801 A1* 5/2024 Lee ......................... C08L 67/02

FOREIGN PATENT DOCUMENTS

| | | | | | |
|---|---|---|---|---|---|
| CN | 114630854 | A | * | 6/2022 | C08G 63/672 |
| JP | 2019014866 | A | | 1/2019 | |
| JP | 2003119259 | A | | 4/2023 | |
| KR | 20190000299 | A | | 1/2019 | |
| TW | 201805345 | A | | 2/2018 | |
| TW | 201833175 | A | * | 6/2018 | B65D 1/00 |

* cited by examiner

*Primary Examiner* — Joseph S Del Sole
*Assistant Examiner* — Ronald Grinsted
(74) *Attorney, Agent, or Firm* — MUNCY, GEISSLER, OLDS & LOWE, P.C.

(57) ABSTRACT

The present application relates to a polyester and the molded product thereof. Determined by aminolytic analysis, the polyester has a weight ratio of the second repeating unit of formula (ii)

(i.e., 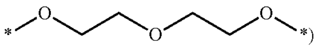 )

to the third repeating unit of formula (iii)

(i.e., 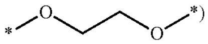 )

is of 0.100 to 0.490 as determined by analysis of the polyester. The polyester of this application has ideal dyeing ability, heat resistance, and mechanical properties.

14 Claims, No Drawings

POLYESTER COMPOSITION AND THE MOLDED PRODUCT THEREOF

BACKGROUND OF THE INVENTION

1. Technical Field

The present application relates to a polyester composition. More particularly, the application relates to but is not limited to a polyester composition and a molded product thereof.

2. Description of Related Art

Polymers with an ester functional group in the main chain are collectively referred to as polyester. Featuring a low mass, resistance to impact, low susceptibility to shattering, and high transparency, polyester can be used as packaging materials for various daily items, e.g., as PET bottles or food packaging films, or food wrap.

Some common examples of polyester are polybutylene terephthalate (PBT), polybutylene isophthalate (PBI), polyethylene terephthalate (PET), polyethylene isophthalate (PEI), polypropylene terephthalate (PPT), polypropylene isophthalate (PPI), polytrimethylene terephthalate (PTT), thermoplastic polyether ester elastomer (TPEE), aliphatic polyalkylene phenylene esters, and polyalkylene phenylene ester ether.

BRIEF SUMMARY OF THE INVENTION

The inventor of the present application found that products prepared from the existing polyesters tend to have unsatisfactory heat resistance or have heat resistance accompanied by poor dyeability and/or low mechanical strength. After research, the inventor further found that by controlling the ratio of the repeating units of a polyester within a certain range, the polyester can be provided with desirable heat resistance along with satisfactory dyeability and mechanical strength, thus meeting the requirements of the industry.

One aspect of the present application provides a polyester that includes: a first repeating unit represented by formula (i):

formula (i)

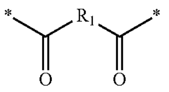

wherein $R_1$ is a $C_6$-$C_{16}$ aryl group; and repeating units derived from a diol. The repeating units derived from the diol include a second repeating unit, a third repeating unit, and an aliphatic cyclic alcohol residue, wherein the second repeating unit and the third repeating unit are represented by formulae (ii) and (iii) respectively:

formula (ii)

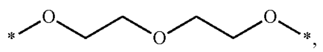

formula (iii)

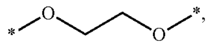

wherein * represents a linking bond. Moreover, the weight ratio of the second repeating unit to the third repeating unit is of 0.100 to 0.490 as determined by aminolytic analysis of the polyester.

In one or more embodiments, R1 is a C6-C16 aromatic hydrocarbon.

In one or more embodiments, the polyester is a polyethylene terephthalate (PET), a polytrimethylene terephthalate (PTT), or a polybutylene terephthalate (PBT).

In one or more embodiments, the polyester is a polyethylene terephthalate (PET).

In one or more embodiments, the first repeating unit is derived from a dibasic acid or a dibasic ester.

In one or more embodiments, the aliphatic cyclic alcohol residue is derived from an alicyclic diol whose boiling at normal temperature and pressure point is not lower than 280° C.

In one or more embodiments, the aliphatic cyclic alcohol residue includes an isosorbide residue, a cyclohexanedimethanol residue, a tricyclodecanedimethanol residue, or a combination of the above.

In one or more embodiments, the weight ratio of the second repeating unit to the third repeating unit is of 0.100 to 0.484.

In one or more embodiments, the aliphatic cyclic alcohol residue includes a structure represented by formula (iv):

formula (iv)

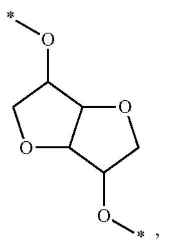

wherein * represents a linking bond.

In one or more embodiments, the weight ratio of the second repeating unit to the third repeating unit is of 0.246 to 0.484.

In one or more embodiments, the aliphatic cyclic alcohol residue includes a structure represented by formula (v):

formula (v)

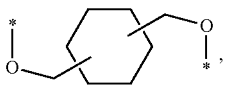

wherein * represents a linking bond.

In one or more embodiments, the weight ratio of the second repeating unit to the third repeating unit is of 0.102 to 0.481.

In one or more embodiments, the aliphatic cyclic alcohol residue includes a structure represented by formula (vi):

formula (vi)

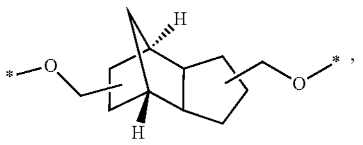

wherein * represents a linking bond.

In one or more embodiments, the weight ratio of the second repeating unit to the third repeating unit is of 0.164 to 0.484.

In one or more embodiments, the second repeating unit makes up not more than 3 wt. % of the total weight of the polyester.

In one or more embodiments, method of the aminolytic analysis comprises that (a) pre-analysis treatment: after the polyester is completely decomposed in a hydrazine (N2H4) solution serving as a solvent and a reagent for degrading the polyester, an internal standard with an specific concentration is added to form a degraded solution; the degraded solution is injected into a gas chromatograph (GC) and exit position of bis-2-hydroxylethyl terephthalate (BHET) is determined by using pure BHET as a standard to check whether an area corresponding to the BHET of the degraded solution is less than 0.01% of entire area; if the BHET area is greater than 0.01% of the entire area, the degradation step need to be performed again, and (b) establishment of the calibration curve: form respectively a series of solutions having five-level concentration gradient of diol A and diol B dissolved in hydrazine solution, wherein the diol A and the diol B derive respectively the second repeating unit and the third repeating unit contained in the polyester; add the same amount of the internal standard into each solution of the diol A/diol B series of solutions having five-level concentration gradient before injecting them into the GC; use nitrogen as mobile phase to detect a linear relationship between the ratio of the GC peak area corresponding to the diol A/diol B to the peak area corresponding to the internal standard and the ratio of the diol A/diol B concentration to the internal standard concentration, and then to obtain the linear relationship with a coefficient of determination R2 greater than 0.99 between the GC peak area and the concentration of each of the diol A and the diol B; the linear relationship of the diol A and the diol B allow the concentration of the second repeating unit and the third repeating unit to be determined respectively.

In one or more embodiments, the polyester has a glass transition temperature ($T_g$) higher than 90° C.

In one or more embodiments, the polyester is prepared by transesterification of a recycled polyester.

In one or more embodiments, the recycled polyester is a recycled PET, a recycled PTT, or a recycled PBT.

Another aspect of the present application provides a molded product formed of the foregoing polyester.

The polyester disclosed in the present application has not only desirable heat resistance, but also satisfactory dyeability and mechanical strength, such that the objective of preparing a polyester that meets the requirements of the industry is achieved. The present application also discloses using recycled polyester as a raw material, thereby gaining the advantage of being in line with the trend of environmental protection.

DETAILED DESCRIPTION OF THE INVENTION

To describe the subject matter of the present application more thoroughly, an explanatory description of certain aspects, and some embodiments, of the present application is given below. Those embodiments, however, are not the only ways in which the subject matter of the present application can be implemented. The embodiments disclosed herein can be combined with, substituted for, or added to one another when it is beneficial to do so, and there is no need for the present application to provide further description or explanation in this regard. Besides, although the following description includes a detailed account of specific details in order for a reader to fully understand the embodiments, the subject matter of the present application can be carried out without the specific details. Moreover, unless otherwise stated in the context, a singular element modified by the article "a" or "the" may be construed as referring to a plurality of such elements.

The methods disclosed herein will be described below as involving a series of operations or steps. The order in which the operations or steps are stated, however, should not be construed as a limitation on the subject matter of the present application. For example, certain operations or steps may be performed in a different order or simultaneously with another step. Furthermore, not all the operations, steps, or features disclosed herein are required for implementing the subject matter of the present application, and each operation or step disclosed herein may include a plurality of sub-steps or actions.

[Polyester]

One aspect of the present application provides a polyester that includes: a first repeating unit represented by formula (i):

formula (i)

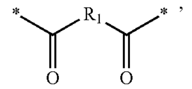

wherein $R_1$ is a $C_6$-$C_{16}$ aryl group; and repeating units derived from a diol. The repeating units derived from the diol comprise a second repeating unit, a third repeating unit, and an aliphatic cyclic alcohol residue, wherein the second repeating unit and the third repeating unit are represented by formulae (ii) and (iii) respectively:

formula (ii)

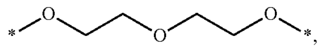

formula (iii)

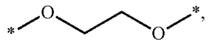

wherein * represents a linking bond. Moreover, the weight ratio of the second repeating unit to the third repeating unit is of 0.100 to 0.490 as determined by aminolytic analysis of the polyester.

According to at least one embodiment of the present application, the polyester of the present application is polyethylene terephthalate (PET), polytrimethylene terephthalate (PTT), or polybutylene terephthalate (PBT); preferably PET or PBT; more preferably PET.

The $C_6$-$C_{16}$ aryl group used herein is any functional group or substituent derived from an $C_6$-$C_{16}$ aromatic ring and comprises substituted or unsubstituted $C_6$-$C_{16}$ aromatic hydrocarbon or $C_6$-$C_{16}$ heteroaromatics. Preferably, embodiments of the $C_6$-$C_{16}$ aryl group in the present application include but are not limited to $C_6$-$C_{16}$ aromatic hydrocarbon.

More preferably, embodiments of the $C_6$-$C_{16}$ aromatic hydrocarbon in the present application include but are not limited to the phenylene group, the tolylene group, the naphthylene group, and the anthrylene group. In some embodiments, $R_1$ in formula (i) of the first repeating unit is

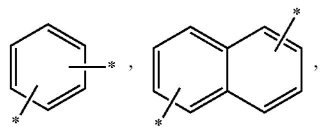

or a combination thereof, wherein * represents a linking bond.

The first repeating unit in the present application may be derived from a dibasic acid or a dibasic ester. The dibasic acid (as a monomer) includes an aromatic dicarboxylic acid monomer. Examples of the dibasic acid include but are not limited to terephthalic acid, isophthalic acid, phthalic acid, 2-methyl-1,4-benzenedicarboxylic acid, 1,4-naphthalenedicarboxylic acid, and 2,6-naphthalenedicarboxylic acid. The dibasic ester may be an ester having a structure corresponding to the above dibasic acid. Examples of the dibasic ester include but are not limited to dimethyl terephthalate, diethyl terephthalate, dimethyl phthalate, diethyl phthalate, dimethyl isophthalate, diethyl isophthalate, dimethyl 2-methyl-1,4-benzenedicarboxylate, dimethyl 1,4-naphthalenedicarboxylate, or dimethyl 2,6-naphthalenedicarboxylate.

According to at least one embodiment of the present application, the second repeating unit and the third repeating unit in the present application are derived from a diol and each have the corresponding structure defined above. By way of aminolytic analysis, the inventor of the present application has found that the polyester of the present application can be provided with satisfactory dyeability and mechanical strength as well as desirable heat resistance by controlling the weight ratio of the second repeating unit of the polyester to the third repeating unit within a specific range, and this in turn allows the polyester to meet the requirements of the industry. More specifically, as determined by aminolytic analysis of the polyester of the present application, the weight ratio of the second repeating unit to the third repeating unit is of 0.100 to 0.490, such as but not limited to 0.100, 0.150, 0.200, 0.250, 0.300, 0.350, 0.400, 0.450, 0.490, or any value in the range defined by any two of the aforesaid values. Preferably, the weight ratio of the second repeating unit of the polyester to the third repeating unit is of 0.102 to 0.484, such as but not limited to 0.102, 0.150, 0.164, 0.190, 0.192, 0.197, 0.246, 0.289, 0.305, 0.330, 0.357, 0.407, 0.414, 0.481, 0.484, or any value in the range defined by any two of the aforesaid values. More preferably, the weight ratio of the second repeating unit of the polyester to the third repeating unit is of 0.102 to 0.481, of 0.164 to 0.484, or of 0.246 to 0.484. According to at least one embodiment of the present application, the source of the second repeating unit or the third repeating unit of the polyester of the present application may be produced during the preparation process of the polyester or can be adjusted by subsequent addition.

According to at least one embodiment of the present application, the second repeating unit content of the polyester is not more than 3 wt. % of the total weight of the polyester, such as but not limited to being not more than 3 wt. %, being not more than 2.5 wt. %, being not more than 2.0 wt. %, being not more than 1.5 wt. %, being not more than 1.0 wt. %, or being not more than 0.5 wt. %. Preferably, the second repeating unit content of the polyester constitutes 2.83 wt. %, 2.78 wt. %, 2.47 wt. %, 2.32 wt. %, 1.97 wt. %, 1.85 wt. %, 1.75 wt. %, 1.65 wt. %, 1.17 wt. %, 1.08 wt. %, 0.96 wt. %, 0.64 wt. %, 0.57 wt. %, 0.55 wt. %, or 0.4 wt. % of the total weight of the polyester.

The "aminolytic analysis" in the present application is a quantitative analysis of the second repeating unit and the third repeating unit of the polyester. According to a preferred embodiment of the present application, the aminolytic analysis uses an internal standard method, which can determine the second repeating unit content and the third repeating unit content more accurately than an external standard method and the $^1$H-nuclear magnetic resonance ($^1$H-NMR) method commonly used in the prior art (the latter two methods tend to produce errors in quantitative analysis as explained in more detail in the next paragraph). The "internal standard method" involves adding into a sample a substance (such as but not limited to the 1,6-hexanediol used in the present application) that has a known concentration, can be completely dissolved in the solvent used, and serves as an internal standard (or internal standard substance) against which comparison can be made to compensate for any error or variance that may take place during the analysis. Measurement by the internal standard method begins by determining the internal standard content of the sample. After that, the amount of the to-be-detected substance in the sample is calculated according to the ratio of the signal of the internal standard to the signal of the to-be-detected substance. As the polyester of the present application has a relatively low second repeating unit content and third repeating unit content (both falling into the realm of microanalysis), it was found by the inventor of the present application that, even though minimized, differences in the treatment and the analysis conditions of the sample and of the standard substance may still have a significant impact on the quantification results (for example, differences in the sampling conditions have a direct impact on the quantification results). Therefore, without being limited by any particular theory, the internal standard method is more suitable than an external standard method.

Unlike the internal standard method, the $^1$H-NMR method is such that during quantitative analysis of the polyester of the present application, the signal of the second repeating unit and the signal of the third repeating unit tend to be affected by the signal of the terminal alcohol in the polyester under test and the signal of cyclic polyester that exists in a trace amount; that all the foregoing signals may cause the characteristic peaks in the $^1$H NMR spectrum to split into even smaller characteristic peaks; that except for the characteristic peak corresponding to the third repeating unit, all the other characteristic peaks are quite close and similar and are therefore likely to be identified as noise; that the characteristic peak corresponding to a butylene glycol residue, a cyclohexanedimethanol residue, a tricyclodecanedimethanol residue, or an isosorbide residue, if any, tends to overlap, and thus interfere with, other characteristic peaks in the spectrum, adding to the complexity of, and hence the difficulty of analyzing, the spectrum; that the integral of the spectrum will vary greatly with waveform adjustment during the test and with the cutting position; that the characteristic peaks will change with the choice of the range of chemical shift; and that the particularly low second repeating unit content and third repeating unit content will aggravate the aforementioned negative effects on the quantification results. This explains why a quantitative analysis of the characteristic peaks of a to-be-detected substance in a trace amount (e.g., the second repeating unit and/or the third repeating unit in the present application) tends to produce relatively inaccurate results.

The aliphatic cyclic alcohol residue in the present application is derived from an alicyclic diol. Preferably, the aliphatic cyclic alcohol residue is derived from an alicyclic diol whose boiling point at normal temperature and pressure is not lower than 280° C. According to at least one embodiment of the present application, the aliphatic cyclic alcohol residue includes a structure represented by formula (iv):

formula (iv)

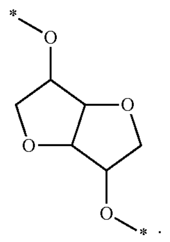

According to at least one embodiment of the present application, the aliphatic cyclic alcohol residue includes a structure represented by formula (v):

formula (v)

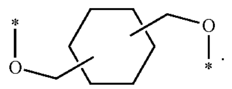

According to at least one embodiment of the present application, the aliphatic cyclic alcohol residue includes a structure represented by formula (vi):

formula (vi)

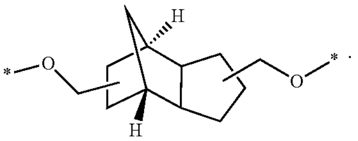

In some embodiments, the aliphatic cyclic alcohol residue includes the structure of formula (iv), the structure of formula (v), the structure of formula (vi), or a combination of the above, such as but not limited to including the structure of formula (iv), the structure of formula (v), or the structure of formula (vi); or including the structure of formula (iv) and the structure of formula (v); or including the structure of formula (iv) and the structure of formula (vi); or including the structure of formula (iv), the structure of formula (v), and the structure of formula (vi). In some embodiments, the structure of formula (iv) is derived from, for example, isosorbide or a combination including the same. In some embodiments, the structure of formula (v) is derived from, for example, cyclohexanedimethanol (CHDM) or a combination including the same. In some embodiments, the structure of formula (vi) is derived from, for example, tricyclodecanedimethanol (TCDDM) or a combination including the same. According to at least one embodiment of the present application, the polyester of the present application is obtained by performing esterification or transesterification on the alicyclic diol as a reactive monomer and then polymerizing the resulting ester.

According to a preferred embodiment of the present application, the aliphatic cyclic alcohol residue of the polyester includes the structure of formula (iv), and the results of aminolysis analysis show that the weight ratio of the second repeating unit of the polyester to the third repeating unit is of 0.246 to 0.484. According to a preferred embodiment of the present application, the aliphatic cyclic alcohol residue of the polyester includes the structure of formula (v), and the results of aminolysis analysis show that the weight ratio of the second repeating unit to the third repeating unit is of 0.102 to 0.481. According to a preferred embodiment of the present application, the aliphatic cyclic alcohol residue of the polyester includes the structure of formula (vi), and the results of aminolysis analysis show that the weight ratio of the second repeating unit to the third repeating unit is of 0.164 to 0.484.

In some embodiments, the polyester of the present application has a glass transition temperature ($T_g$) higher than or equal to 75° C., such as but not limited to 78° C., 84° C., 89° C., 90° C., 92° C., 93° C., 95° C., 96.1° C., 96.3° C., 109° C., 110° C., or any temperature in the range defined by any two of the aforesaid temperatures. It is believed that the polyester is adequately resistant to heat when having a relatively high glass transition temperature.

The polyester of the present application may further include, to an extent that does not compromise the objective of the present application, an ingredient or ingredients that, thanks to the extensive range of functions they provide, are required for subsequently processing the polyester into a molded product, such as an additive, a modifier, or a reinforcing agent. The additive, for example, includes a stabilizer (e.g., an ultraviolet light absorber), an antioxidant, a heat stabilizer, a lubricant, a mold release agent, a catalyst deactivation agent, a nucleating agent, and a crystallization promoter.

[Methods for Preparing the Polyester]

There is no special limitation on the method of preparing the polyester of the present application. A person with common knowledge in the field to which the present application pertains will be able to choose an appropriate preparation method based on the disclosure of this specification. For example, the polyester of the present application may be prepared by “polymerization after esterification” or “polymerization after transesterification (also known as ester interchange),” the steps of which two methods are as follows. First, the reactive monomers, namely a diol and a dibasic acid (for the esterification reaction) or a diol and a dibasic ester (for the transesterification reaction), are mixed in a high-pressure reaction kettle along with the required additive(s) such as a catalyst, a cocatalyst, and a heat stabilizer in order to form a mixture. The reactive monomer may be added all at once or in several additions, and in the latter case, the present application has no limitation on the number of additions. Next, the mixture is thoroughly mixed under a temperature-increasing and pressure-increasing condition and with a rotation speed of, for example, 100 to 500 rpm, the objective being for the monomer in the mixture to go through the esterification or transesterification reaction and become an oligomer. The temperature-increasing condition may involve, for example, an increase in temperature from room temperature to 180° C. or from room temperature to 270° C. The pressure-increasing condition may involve, for example, an increase in pressure from 0 standard atmosphere (atm) to 6 atm, preferably from 1 atm to 4 atm. The reaction time of the esterification reaction may be, for example, 2 to 6 hours, and the reaction time of the transesterification reaction may be, for example, 1 to 6 hours. Following that, under another temperature-increasing condition, vacuum pumping is performed to subject the oligomer-containing mixture to a pressure of 3 torr or lower, preferably 1 torr, for 30 to 180 minutes in order to remove excessive monomer. This temperature-increasing condition may involve, for example, an increase in temperature from 260° C. to 310° C., and a chain extender or cross-linking agent may be added if necessary. Once the polymerization reaction is completed, which takes 1.5 to 8 hours for example, the intended polyester is obtained.

In some embodiments, how the esterification reaction proceeds under the corresponding temperature-increasing condition can be determined by observing the amount of the alcohol or water produced by the reaction. More specifically, theoretical calculation can be conducted to determine the theoretical amount of the alcohol or water resulting from the reaction of all the monomer in the mixture. When the amount of the alcohol or water actually produced reaches or exceeds 80 wt. % of the theoretical amount (such as but not limited to being 85 wt. %, 90 wt. %, or 95 wt. % of the theoretical amount), it can be inferred that the esterification reaction is completed, which means the subsequent vacuum pumping step can be performed.

The catalyst, the cocatalyst, and the heat stabilizer may be added at the beginning of the reaction or right before the vacuum pumping step. There is no special limitation on the type of the catalyst, and the catalyst may be, for example but not limited to, titanium (IV) butoxide, antimony trioxide ($Sb_2O_3$), antimony (III) acetate ($Sb(OAc)_3$), germanium dioxide ($GeO_2$), titanium (IV) isopropoxide, butyltin tris(2-ethylhexanoate), or a combination of the above. There is no special limitation on the type of the cocatalyst either, and the cocatalyst may be, for example but not limited to, cupric acetate, zinc acetate, magnesium acetate, sodium acetate, potassium acetate, or a combination of the above. There is also no special limitation on the type of the heat stabilizer, and the heat stabilizer may be, for example but not limited to, phosphoric acid, phosphorous acid, hypophosphorous acid or a salt thereof, trimethyl phosphate (TMP), triethyl phosphate (TEP), triphenyl phosphate (TPP), 3,9-bis(octadecyloxy)-2,4,8,10-tetraoxa-3,9-diphosphaspiro[5.5]undecane), bis(2,6-di-ter-butyl-4-methylphenyl) pentaerythritol-diphosphite), tris(2,4-di-tert-butylphenyl)phosphite), tetrakis(2,4-di-tert-butylphenyl)[1,1'-biphenyl]-4,4'-diylbis (phosphonite)), or a combination of the above. The type of the chain extender is subject to no special limitation, and the chain extender may be, for example but not limited to, hexamethylene diisocyanate (HDI).

As to the reactive monomers used to prepare the polyester, some embodiments use isosorbide, CHDM, TCDDM, ethylene glycol (EG), diethylene glycol (DEG), or a combination of the above as the diol monomer in the present application; some embodiments use terephthalic acid (PTA) as the dibasic acid monomer in the present application; and some embodiments use PCR (post-consumer recycled) plastic (e.g., PET), bis-2-hydroxylethyl terephthalate (BHET), ethylene glycol and terephthalate (in a ratio of 3:2), or dimethyl terephthalate (DMT) as the dibasic ester monomer or oligomer in the present application.

In one preferred embodiment, the polyester of the present application does not contain butanediol (BDO) and/or any residue derived from BDO. In a more preferred embodiment, the polyester of the present application is PET.

In one embodiment of the present application, the polyester of the present application is prepared by subjecting recycled polyester to transesterification. More specifically, the recycled polyester is aminolyzed to an oligomer, and the oligomer and a corresponding diol go through a transesterification reaction before the transesterification product is polymerized. For example, either the BHET or the ethylene glycol and terephthalate (in a ratio of 3:2) obtained by degradation of the recycled polyester may be used as the raw material that goes through the subsequent reaction. The recycled polyester may be, for example but not limited to, recycled polyethylene terephthalate (PET), polytrimethylene terephthalate (PTT), or polybutylene terephthalate (PBT), preferably recycled PET or PBT. The use of recycled polyester allows the resulting polyester to be advantageously in line with the trend of environmental protection while meeting the dyeability and mechanical strength requirements of the industry. The recycled polyester and chemicals derived therefrom of the present application can be certified in accordance with the International Sustainability and Carbon Certification (ISCC) provisions, as circular polymer and chemicals. Moreover, the recycled polyester and chemicals derived therefrom can be certified as circular at any point along complex chemical reaction pathways or even remote from the point of introduction of pyrolysis oil. The content of the recycled polyester and chemicals derived therefrom can obtained from the original pyrolysis oil co-feedstock, and thus can be certified by ISCC.

The polyester obtained by either of the foregoing preparation methods can be cut into pellets in order to be injection-molded. Before injection molding, the polyester pellets must be oven-dried until their water content is lower than 200 ppm, preferably lower than 100 ppm, more preferably lower than 50 ppm.

[Molded Product]

The polyester of the present application can be rendered into various molded products by conventional molding methods in the field to which the present application pertains, in order to be used in different fields. Such a molded product includes but is not limited to a film, a base-layer film, a sheet, a plate, a stretched sheet, a monofilament, a multifilament, a non-woven fabric, a zero-twist yarn, a short fiber, a crimped fiber, a striped ribbon, a composite fiber, a foam, or an injection-molded object. The fields in which the polyester of the present application can be used include but are not limited to food contact materials, automotive molds, commercial housewares, compound consumables, electronic products, device housings, in-store fixtures, electronics packaging materials, outdoor signs, personal care products, cosmetics packaging, textile and clothing, exercise apparatus, toys, and bottles.

EMBODIMENTS

The subject matter of the present application will be described in more detail below with reference to a number of embodiments. It should be understood, however, that those embodiments serve only to facilitate understanding of the present application and are not intended to be restrictive of the scope of the present application.

I. Analysis Methods

The methods for analyzing and testing the polyesters in examples 1-15 and in comparative examples 1-11 are as follows.

[$^1$H-NMR Analysis]

1. Sample preparation: Each polyester to be tested was dissolved in deuterated chloroform ($CDCl_3$) (purchased from Aldrich) such that a solution having a concentration of 5 mg/mL was obtained.

2. Analysis instrument: AVANCE-500 NMR spectrometer (purchased from BRUKER, Germany).

3. Analysis method: The resonance frequency was set at 500 MHZ, and the pulse width at 10 microseconds. The waiting time was 2 seconds. Data acquisition was performed repeatedly for a total of 32 times. Once the NMR test on the sample solution was completed, the signals obtained were converted by Fourier transform into an NMR spectrum, with the signal of deuterated chloroform set at 7.24 ppm.

[Aminolytic Analysis]

1. Pre-analysis treatment: 5 g of each polyester to be tested and 20 g of hydrazine (N2H4) solution (60 wt. % hydrazine and 40 wt. % water, purchased from Aldrich) were weighed out with precision, put into a 50-mL Erlenmeyer flask, heated until boiling, and refluxed (at a temperature of 110 to 120° C.) for 4 hours, with the hydrazine solution serving as a solvent and a reagent for degrading the polyester. When the polyester was completely decomposed, the temperature was lowered, and the mixed solution was weighed again. An internal standard of an appropriate concentration was then added (a 1,6-hexanediol (HDO) aqueous solution of a concentration of 6000 ppm was used as the internal standard for the embodiments), and the mixture was filtered through 5A filter paper to produce a degraded solution. The degraded solution was injected into a gas chromatograph (GC), and pure BHET was used as a standard so that the exit position of the BHET could be determined. After that, the gas chromatogram of the degraded solution was analyzed to check whether the area corresponding to the BHET was less than 0.01% of the entire area. If the BHET area was greater than 0.01% of the entire area, indicating an incomplete degradation reaction, the degradation step would be performed again.

2. Establishment of the calibration curve: Given that the second repeating unit of each polyester in the embodiments was derived from diethylene glycol (DEG) (and therefore can be referred to as a DEG residue), and that the third repeating unit of each polyester was derived from EG (and therefore can be referred to as an EG residue), DEG and EG were separately dissolved in a hydrazine ($N_2H_4$) solution to each produce a series of solutions having a five-level concentration gradient. The five-level concentration gradient for DEG was 0.1 wt. %, 0.3 wt. %, 0.6 wt. %, 1.2 wt. %, and 2.0 wt. %, and the five-level concentration gradient for EG was 1 wt. %, 3 wt. %, 10 wt. %, 15 wt. %, and 20 wt. %. Each solution in the DEG/EG series of solutions having the five-level concentration gradient was added, and thoroughly mixed, with the same amount of the internal standard having an appropriate concentration (a 6000-ppm HDO aqueous solution was used as the internal standard for the embodiments) and then injected into the GC. Nitrogen gas was used as the mobile phase, in conjunction with an HP-1 column having a length of 50 m, an inner diameter of 0.32 mm, and a liquid-phase film thickness of 1.05 μm. The injection temperature and testing temperature were set at 280° C. The oven temperature was kept at 80° C. for 3 minutes, then increased to 300° C. at 20° C./min, and then kept at 300° C. for 3 minutes. With HDO being the internal standard, the ratio of the peak area corresponding to DEG/EG to the peak area corresponding to HDO was determined and was found to be in linear relationship with the ratio of the DEG/EG concentration to the HDO concentration. The linear relationship between the GC peak area and concentration of each of DEG and EG was subsequently established, with a coefficient of determination (R2) greater than 0.99. This linear relationship allowed the concentrations of DEG and EG residues to be determined.

[Glass Transition Temperature ($T_g$) Analysis]

The glass transition temperature of each polyester to be tested was determined in accordance with the standard method of ISO 3146, using a differential scanning calorimetry (DSC) analyzer (purchased from TA Instruments) and a thermal mechanical analyzer.

[Inherent Viscosity (IV) Analysis]

The inherent viscosity of each polyester to be tested was determined in accordance with the standard method of ASTM D4603, using a kinematic viscosity analyzer (CRC-31L, purchased from Shuenn Yih Instrument Co., Ltd.), with the unit of inherent viscosity being "dL/g."

[Tensile Elongation (T.E.) Analysis]

The tensile elongation of each polyester to be tested was determined in accordance with the standard method of ISO 527, using a universal material testing machine (purchased from Instron), with the unit of tensile elongation being "MPa."

[Dyeability Analysis]

1. Standard method: The analysis was conducted in accordance with the standard method of ASTM D6290.

2. Sample preparation: Each polyester to be tested was cut into pellets and then injection-molded into a 100 mm*100 mm*3 mm planar test plate, and during the injection molding process, a color masterbatch was mixed into the pellets at 1 wt. %. Blue, black, and red masterbatches were used in the test.

3. Analysis method: Once the planar test plate was formed by injection molding, the "L*," "a*," and "b*" values (as defined in the Lab color model) of three randomly selected points on the planar test plate were determined in accordance with the standard method of ASTM D6290, and the average $\Delta E^*_{ab}$ of the three points was calculated. The smaller the $\Delta E^*_{ab}$ value, the more even the color of the planar test plate. The dyeability of each polyester under test was classified into one of four grades: excellent, good, fair, and poor.

II. Analysis of the Properties of the Polyesters in the Embodiments

Examples 1-5 and Comparative Examples 1-4

The polyesters in examples 1-5 and in comparative examples 1-4 were prepared and analyzed by the preparation method and analysis methods stated above. The details and properties of each polyester (including the polyester formula, the process conditions, the relative amount of each repeating unit, and the analysis results regarding glass transition temperature ($T_g$), inherent viscosity, tensile elongation, and dyeability) are shown in Table 1. In Table 1, the ethylene glycol and terephthalate (3:2) has the following structure:

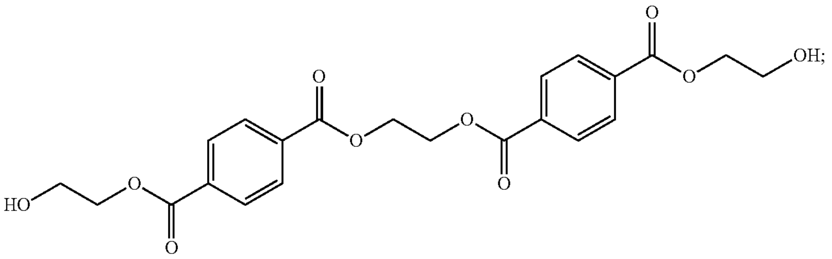

the PTA residue is a repeating unit derived from PTA, and the PTA residue content (in the unit of mol %) of each polyester was calculated based on the total number of moles of the dibasic acid-derived repeating unit of the polyester; the EG residue is a repeating unit derived from EG, and the EG residue content (in the unit of mol %) of each polyester was calculated based on the total number of moles of the diol-derived repeating units of the polyester; the structure of formula (vi) is a repeating unit derived from TCDDM, and the relative amount of this structure (in the unit of mol %) in each polyester was calculated based on the total number of moles of the diol-derived repeating units of the polyester; the structure of formula (v) is a repeating unit derived from CHDM, and the relative amount of this structure (in the unit of mol %) in each polyester was calculated based on the total number of moles of the diol-derived repeating units of the polyester; and the BDO residue is a repeating unit derived from BDO, and the BDO residue content (in the unit of mol %) of each polyester was calculated based on the total number of moles of the diol-derived repeating units of the polyester.

TABLE 1

| | | Example | | | | | Comparative example | | | |
|---|---|---|---|---|---|---|---|---|---|---|
| Item | | 1 | 2 | 3 | 4 | 5 | 1 | 2 | 3 | 4 |
| Polyester formula | | | | | | | | | | |
| ester monomer or polyester | Ethylene glycol and terephthalate (3:2) (mol %) | 50 | | | 50 | 50 | | | | |
| | BHET (mol %) | | 100 | | | | | | 100 | |
| | PCR-PET (mol %) | | | 100 | | | | | | |
| acid monomer | PTA (mol %) | | | | | | 100 | 100 | | 100 |
| alcohol monomer | TCDDM (mol %) | 80 | 80 | 78 | | | 78 | | | |
| | CHDM (mol %) | | | | 35 | 33 | | 32 | | |
| | EG (mol %) | | | | | | 100 | 158 | | 120 |
| | BDO (mol %) | | | | | | | | 100 | |
| Process conditions | | | | | | | | | | |
| Pressure achieved by vacuum pumping (torr) | | 1 | 1 | 1.5 | 1 | 2 | 1 | 1.5 | 1 | 2 |
| Time for which vacuum pumping continued (min) | | 60 | 40 | 55 | 65 | 55 | 55 | 60 | 30 | 40 |
| $^1$H-NMR analysis | | | | | | | | | | |
| Dibasic acid-derived repeating unit | PTA residue (mol %) | 100 | 100 | 100 | 100 | 100 | 100 | 100 | 100 | 100 |
| Diol-derived repeating unit | EG residue (mol %) | 24 | 25 | 25 | 69 | 69 | 25 | 69 | 83 | 100 |
| | Structure of formula (vi) (mol %) | 76 | 75 | 75 | | | 75 | | | |
| | Structure of formula (v) (mol %) | | | | 31 | 31 | | 31 | | |
| | BDO residue (mol %) | | | | | | | | 17 | |

TABLE 1-continued

| Item | Example 1 | Example 2 | Example 3 | Example 4 | Example 5 | Comparative example 1 | Comparative example 2 | Comparative example 3 | Comparative example 4 |
|---|---|---|---|---|---|---|---|---|---|
| Aminolytic analysis | | | | | | | | | |
| Second repeating unit (wt. %) | 1.17 | 1.08 | 0.55 | 2.83 | 2.78 | 0.19 | 0.72 | 1.80 | 1.19 |
| Third repeating unit (wt. %) | 3.28 | 3.54 | 3.36 | 13.70 | 14.13 | 3.50 | 16.48 | 20.51 | 26.00 |
| Second repeating unit/third repeating unit weight ratio | 0.357 | 0.305 | 0.164 | 0.192 | 0.197 | 0.054 | 0.044 | 0.088 | 0.046 |
| Analysis of polyester properties | | | | | | | | | |
| Glass transition temperature (° C.) | 110 | 110 | 109 | 78 | 78 | 110 | 78 | 67 | 73 |
| Inherent viscosity (dL/g) | 0.75 | 0.74 | 0.67 | 0.82 | 0.73 | 0.61 | 0.83 | 0.81 | 0.78 |
| Tensile elongation (MPa) | 232 | 228 | 183 | 324 | 330 | 176 | 243 | 323 | 362 |
| Dyeability | Excel-lent | Excel-lent | Good | Good | Good | Good | Fair | Good | Poor |

As shown in Table 1, the polyesters in examples 1-5 of the present application have appropriate second repeating unit/third repeating unit weight ratios that have given rise to not only high resistance to heat, but also satisfactory tensile strength and dyeability. Without being limited by any particular theory, it is believed that the structure of formula (vi) is associated with the heat resistance of a polyester. More specifically, a polyester having the structure of formula (vi) has a higher glass transition temperature and higher resistance to heat than a polyester that does not have the structure of formula (vi). The polyesters in all of examples 1-3 have the structure of formula (vi) and therefore have relatively high $T_g$. Given the same basis for comparison, the polyester in comparative example 1 has a second repeating unit/third repeating unit weight ratio lower than the range specified in the present application and therefore does not have satisfactory tensile strength, despite its desirable heat resistance.

Without being limited by any particular theory, it is believed that the structure of formula (v) is associated with the tensile strength of a polyester. More specifically, a polyester having the structure of formula (v) has higher tensile strength than a polyester that does not. The polyesters in both examples 4 and 5 have the structure of formula (v) and therefore have relatively high tensile strength. Given the same basis for comparison, the polyester in comparative example 2 has a second repeating unit/third repeating unit weight ratio lower than the range specified in the present application and therefore has relatively low tensile strength. Moreover, the relatively high third repeating unit content of the polyester in comparative example 2 has led to poor dyeability.

The polyester in comparative example 3 does not have satisfactory heat resistance, tensile strength, and dyeability at the same time because it has the BDO residue, does not have the structure of formula (v) or the structure of formula (iv), and has a second repeating unit/third repeating unit weight ratio lower than the range specified in the present application.

The polyester in comparative example 4 is a conventional PET resin, has a second repeating unit/third repeating unit weight ratio lower than the range specified in the present application, does not have the structure of formula (v) or the structure of formula (iv), and as can be inferred from the data in Table 1, does not have satisfactory heat resistance, tensile strength, and dyeability at the same time.

Examples 6-10 and Comparative Examples 5-7

The polyesters in examples 6-10 and in comparative examples 5-7 were prepared and analyzed by the preparation method and analysis methods stated above. The details and properties of each polyester (including the polyester formula, the process conditions, the relative amount of each repeating unit, and the analysis results regarding glass transition temperature ($T_g$), the duration of polymerization, inherent viscosity, tensile elongation, and dyeability) are shown in Table 2. In Table 2, the BHET as well as the ethylene glycol and terephthalate is a recycled monoester, but the DMT is not a recycled ester. Besides, by analogy to the foregoing embodiments, the PTA residue is a repeating unit derived from PTA, and the PTA residue content (in the unit of mol %) of each polyester was calculated based on the total number of moles of the dibasic acid-derived repeating unit of the polyester; the EG residue is a repeating unit derived from EG, and the EG residue content (in the unit of mol %) of each polyester was calculated based on the total number of moles of the diol-derived repeating units of the polyester; the structure of formula (vi) is a repeating unit derived from TCDDM, and the relative amount of this structure (in the unit of mol %) in each polyester was calculated based on the total number of moles of the diol-derived repeating units of the polyester; the structure of formula (v) is a repeating unit derived from CHDM, and the relative amount of this structure (in the unit of mol %) in each polyester was calculated based on the total number of moles of the diol-derived repeating units of the polyester, and the structure of formula (iv) is a repeating unit derived from isosorbide, and the relative amount of this structure (in the unit of mol %) in each polyester was calculated based on the total number of moles of the diol-derived repeating units of the polyester.

TABLE 2

| Item | | Example 6 | Example 7 | Example 8 | Example 9 | Example 10 | Comparative example 5 | Comparative example 6 | Comparative example 7 |
|---|---|---|---|---|---|---|---|---|---|
| Polyester formula | | | | | | | | | |
| ester monomer | Ethylene glycol and terephthalate (3:2) (mol %) | 50 | 50 | | 50 | 50 | | | |
| | BHET (mol %) | | | 100 | | | | | |
| | DMT (mol %) | | | | | | 100 | 100 | 100 |
| alcohol monomer | TCDDM (mol %) | 25 | 35 | | | | 35 | | |
| | CHDM (mol %) | 75 | 65 | 60 | 60 | 50 | 65 | 60 | 80 |
| | Isosorbide (mol %) | | | 20 | 20 | 20 | | 20 | 20 |
| | EG (mol %) | | | | | | 100 | 100 | 80 |
| Process conditions | | | | | | | | | |
| Pressure achieved by vacuum pumping (torr) | | 1.5 | 1 | 1.5 | 2 | 1 | 1 | 1.5 | 1 |
| Time for which vacuum pumping continued (min) | | 60 | 50 | 35 | 30 | 80 | 50 | 30 | 70 |
| $^1$H-NMR analysis | | | | | | | | | |
| Dibasic acid-derived repeating unit | PTA residue (mol %) | 100 | 100 | 100 | 100 | 100 | 100 | 100 | 100 |
| Diol-derived repeating unit | EG residue (mol %) | 18 | 15 | 37 | 41 | 43 | 12 | 38 | 18 |
| | Structure of formula (vi) (mol %) | 25 | 35 | | | | 28 | | |
| | Structure of formula (v) (mol %) | 57 | 50 | 55 | 50 | 49 | 60 | 58 | 77 |
| | Structure of formula (iv) (mol %) | | | 8 | 9 | 8 | | 4 | 5 |
| Aminolytic analysis | | | | | | | | | |
| Second repeating unit (wt. %) | | 0.64 | 0.57 | 2.47 | 2.32 | 1.97 | 0.03 | 0.34 | 0.08 |
| Third repeating unit (wt. %) | | 3.36 | 1.97 | 5.13 | 7.02 | 8.00 | 1.84 | 7.30 | 2.97 |
| Second repeating unit/third repeating unit weight ratio | | 0.190 | 0.289 | 0.481 | 0.330 | 0.246 | 0.016 | 0.047 | 0.027 |
| Analysis of polyester properties | | | | | | | | | |
| Glass transition temperature (° C.) | | 93 | 96.1 | 90 | 92 | 92 | 96 | 91 | 96 |
| Duration of transesterification/esterification | | 60 | 60 | 90 | 90 | 90 | 180 | 240 | 240 |
| Duration of polymerization (min) | | 90 | 78 | 112 | 120 | 105 | 125 | 180 | 170 |
| Inherent viscosity (dL/g) | | 0.75 | 0.76 | 0.82 | 0.82 | 0.79 | 0.71 | 0.80 | 0.78 |
| Tensile elongation (MPa) | | 213 | 229.8 | 202 | 212 | 231 | 187 | 180 | 147 |
| Dyeability | | Excellent | Excellent | Excellent | Excellent | Excellent | Good | Good | Good |

As shown in Table 2, the polyesters in examples 6-10 of the present application have appropriate second repeating unit/third repeating unit weight ratios that have given rise to not only high resistance to heat, but also satisfactory tensile strength and dyeability. More specifically, the polyesters in both examples 6 and 7 have the structure of formula (vi) and the structure of formula (v), and the polyesters in all of examples 8-10 have the structure of formula (v) and the structure of formula (iv). Given the same basis for comparison, the polyesters in comparative examples 5-7 have second repeating unit/third repeating unit weight ratios lower than the range specified in the present application and therefore have relatively low tensile strength, despite their desirable heat resistance; furthermore, the polyesters in examples 6-10 have better dyeability than the polyesters in comparative examples 5-7. In addition, given the similar ranges of inherent viscosity, the polyesters in examples 6-10, in which recycled esters were used as the reactive monomers, have shorter durations of esterification and shorter durations of polymerization than the polyesters in comparative examples 5-7, in which the reactive monomer was not a recycled ester, and this indicates that using a recycled ester as the reactive monomer helps shorten the production time and increase production efficiency.

Examples 11-15 and Comparative Examples 8-11

The polyesters in examples 11-15 and in comparative examples 8-11 were prepared and analyzed by the preparation method and analysis methods stated above. The details and properties of each polyester (including the polyester formula, the process conditions, the relative amount of each repeating unit, and the analysis results regarding glass transition temperature ($T_g$), inherent viscosity, tensile elongation, and dyeability) are shown in Table 3. By analogy to the foregoing embodiments, the PTA residue is a repeating unit derived from PTA, and the PTA residue content (in the unit of mol %) of each polyester was calculated based on the total number of moles of the dibasic acid-derived repeating unit of the polyester; the EG residue is a repeating unit derived from EG, and the EG residue content (in the unit of mol %) of each polyester was calculated based on the total number of moles of the diol-derived repeating units of the polyester; the structure of formula (vi) is a repeating unit derived from TCDDM, and the relative amount of this structure (in the unit of mol %) in each polyester was calculated based on the total number of moles of the diol-derived repeating units of the polyester; the structure of formula (v) is a repeating unit derived from CHDM, and the relative amount of this structure (in the unit of mol %) in each polyester was calculated based on the total number of moles of the diol-derived repeating units of the polyester; and the structure of formula (iv) is a repeating unit derived from isosorbide, and the relative amount of this structure (in the unit of mol %) in each polyester was calculated based on the total number of moles of the diol-derived repeating units of the polyester.

TABLE 3

| | | Examples | | | | | Comparative example | | | |
|---|---|---|---|---|---|---|---|---|---|---|
| Item | | 11 | 12 | 13 | 14 | 15 | 8 | 9 | 10 | 11 |
| Polyester formula | | | | | | | | | | |
| ester monomer or polyester | Ethylene glycol and terephthalate (3:2) (mol %) | 50 | | | | | | | | |
| | DMT (mol %) | | | | | | 100 | | | |
| | BHET (mol %) | | 100 | | 100 | | | 100 | | |
| | PCR-PET (mol %) | | | 100 | | 100 | | | | |
| acid monomer | PTA (mol %) | | | | | | | | 100 | 100 |
| alcohol monomer | TCDDM (mol %) | 60 | 60 | 60 | | | 60 | 60 | | |
| | Isosorbide (mol %) | 40 | 40 | 40 | | | 40 | 40 | | |
| | EG (mol %) | | | | | | 100 | | 123 | 108 |
| | CHDM (mol %) | | | | 82 | 70 | | | 67 | 82 |
| Process conditions | | | | | | | | | | |
| Pressure achieved by vacuum pumping (torr) | | 1.5 | 1 | 2 | 1.5 | 1 | 1.5 | 3 | 2 | 1.5 |
| Time for which vacuum pumping continued (min) | | 70 | 30 | 40 | 30 | 60 | 40 | 10 | 40 | 50 |
| $^1$H-NMR analysis | | | | | | | | | | |
| Dibasic acid-derived repeating unit | PTA residue (mol %) | 100 | 100 | 100 | 100 | 100 | 100 | 100 | 100 | 100 |
| Diol-derived repeating unit | EG residue (mol %) | 32 | 30 | 30 | 21 | 35 | 30 | 31 | 35 | 22 |
| | Structure of formula (vi) (mol %) | 58 | 59 | 58 | | 65 | 60 | 58 | | |
| | Structure of formula (v) (mol %) | | | | 79 | | | | 65 | 78 |
| | Structure of formula (iv) (mol %) | 10 | 11 | 12 | | | 10 | 11 | | |

TABLE 3-continued

| Item | Examples | | | | | Comparative example | | | |
|---|---|---|---|---|---|---|---|---|---|
| | 11 | 12 | 13 | 14 | 15 | 8 | 9 | 10 | 11 |
| Aminolytic analysis | | | | | | | | | |
| Second repeating unit (wt. %) | 1.75 | 1.65 | 1.85 | 0.4 | 0.96 | 0.01 | 1.92 | 0.15 | 0.12 |
| Third repeating unit (wt. %) | 4.30 | 3.99 | 3.82 | 3.91 | 6.40 | 5.97 | 3.86 | 7.66 | 4.16 |
| Second repeating unit/third repeating unit weight ratio | 0.407 | 0.414 | 0.484 | 0.102 | 0.150 | 0.002 | 0.497 | 0.020 | 0.029 |
| Analysis of polyester properties | | | | | | | | | |
| Glass transition temperature (° C.) | 95 | 96.1 | 96.3 | 89 | 84 | 96 | 93 | 85 | 89 |
| Inherent viscosity (dL/g) | 0.65 | 0.67 | 0.51 | 0.88 | 0.91 | 0.62 | 0.45 | 0.83 | 0.87 |
| Tensile elongation (MPa) | 181 | 179 | 123 | 216.8 | 197 | 169 | 87.2 | 182.1 | 156 |
| Dyeability | Excellent | Excellent | Excellent | Excellent | Excellent | Good | Excellent | Good | Good |

As shown in Table 3, the polyesters in examples 11-15 of the present application have appropriate second repeating unit/third repeating unit weight ratios that have given rise to not only high resistance to heat, but also satisfactory tensile strength and dyeability. More specifically, the polyesters in all of examples 11-13 have the structure of formula (vi) and the structure of formula (iv), the polyester in example 14 has the structure of formula (v), and the polyester in example 15 has the structure of formula (vi). Given the same basis for comparison, the polyesters in comparative examples 8, 10, and 11 have second repeating unit/third repeating unit weight ratios lower than the range specified in the present application and therefore have relatively low tensile strength, despite their desirable heat resistance; furthermore, the polyesters in examples 11-15 have better dyeability than the polyesters in comparative examples 8, 10, and 11. The polyester in comparative example 9, on the other hand, has a second repeating unit/third repeating unit weight ratio that is higher than the range specified in the present application and that is believed to indicate insufficient polymerization, an excessively low molecular weight, and hence poor mechanical performance due to a lack of desirable tensile strength.

III. Difference Between Aminolytic Analysis and $^1$H-NMR Analysis

The polyesters in example 14 of the present application and in comparative example 6 were analyzed using the aminolytic analysis method and $^1$H-NMR analysis method stated above. The analysis results of the second repeating unit/third repeating unit weight ratios of the polymers are shown in Table 4.

TABLE 4

| Item | Example 14 | Comparative example 6 |
|---|---|---|
| Second repeating unit/third repeating unit weight ratio as determined by aminolytic analysis | 0.102 | 0.047 |

TABLE 4-continued

| Item | Example 14 | Comparative example 6 |
|---|---|---|
| Second repeating unit/third repeating unit weight ratio as determined by $^1$H-NMR analysis | 0.089 | 0.102 |

As shown in Table 4, the second repeating unit/third repeating unit weight ratio of the polyester in example 14 is 0.102 as determined by aminolytic analysis and 0.089 as determined by $^1$H-NMR analysis, with a 12.7% error between the two analysis results. By contrast, the second repeating unit/third repeating unit weight ratio of the polyester in comparative example 6 is 0.047 as determined by aminolytic analysis and 0.102 as determined by $^1$H-NMR analysis, with a 117% error between the two analysis results. It can be known from the above that when the second repeating unit and the third repeating unit are analyzed by the 1H-NMR analysis method, there may be a significant error in the quantification result, and the comparison presented in Table 4 is sufficient to show that the aminolytic analysis method used in the present application can quantify the second repeating unit and the third repeating unit of the polyester more accurately than the $^1$H-NMR analysis method.

According to the above, the polyester of the present application has satisfactory dyeability and mechanical strength as well as desirable resistance to heat. Moreover, by using recycled polyester as a raw material, the objective of preparing a polyester that meets the requirements of the industry can be achieved while being in line with the trend of environmental protection.

In the present application, each numerical range given is intended to include all the specified sub-ranges in the given range and a combination of all the possible sub-ranges in the given range. Besides, unless stated otherwise, each numerical range provided in the present application includes the end points of the range. For example, the range from 1 to 5 includes 1, 2, 3, 4, 5, and such sub-ranges as 2 to 5, 3 to 5, 2 to 3, 2 to 4, and 1 to 4.

For any and all purposes, all the publications and patent applications cited herein are incorporated into the present application by reference as if each such publication or patent application were specifically and individually indicated to be so incorporated. In the event of inconsistency between the present application and any publication or patent application incorporated into the present application by reference, the present application will prevail.

What is claimed is:

1. A polyester, comprising:

a first repeating unit represented by formula (i):

formula (i)

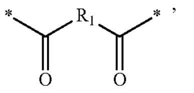

wherein $R_1$ is a $C_6$-$C_{16}$ aryl group; and repeating units derived from a diol, wherein the repeating units derived from the diol comprise a second repeating unit, a third repeating unit, and an aliphatic cyclic alcohol residue, wherein the second repeating unit and the third repeating unit are represented by formulae (ii) and (iii) respectively:

formula (ii)

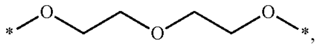

formula (iii)

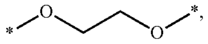

wherein * represents a linking bond;

wherein a weight ratio of the second repeating unit to the third repeating unit is of 0.100 to 0.490 as determined by aminolytic analysis of the polyester.

2. The polyester of claim 1, wherein the aliphatic cyclic alcohol residue is derived from an alicyclic diol whose boiling point at normal temperature and pressure is not lower than 280° C.

3. The polyester of claim 1, wherein the aliphatic cyclic alcohol residue comprises an isosorbide residue, a cyclohexanedimethanol residue, a tricyclodecanedimethanol residue, or a combination thereof.

4. The polyester of claim 1, wherein the weight ratio of the second repeating unit to the third repeating unit is of 0.100 to 0.484.

5. The polyester of claim 1, wherein the aliphatic cyclic alcohol residue comprises a structure represented by formula (iv):

formula (iv)

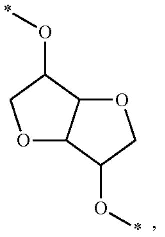

wherein * represents a linking bond.

6. The polyester of claim 5, wherein the weight ratio of the second repeating unit to the third repeating unit is of 0.246 to 0.484.

7. The polyester of claim 1, wherein the aliphatic cyclic alcohol residue comprises a structure represented by formula (v):

formula (v)

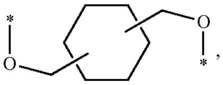

wherein * represents a linking bond.

8. The polyester of claim 3, wherein the weight ratio of the second repeating unit to the third repeating unit is of 0.102 to 0.481.

9. The polyester of claim 1, wherein the aliphatic cyclic alcohol residue comprises a structure represented by formula (vi):

formula (vi)

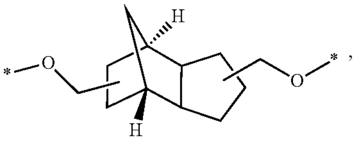

wherein * represents a linking bond.

10. The polyester of claim 5, wherein the weight ratio of the second repeating unit to the third repeating unit is of 0.164 to 0.484.

11. The polyester of claim 1, wherein the second repeating unit constitutes not more than 3 wt. % of a total weight of the polyester.

12. The polyester of claim 1, wherein the polyester has a glass transition temperature ($T_g$) higher than 90° C.

13. The polyester of claim 1, wherein the polyester is prepared by transesterification of a recycled polyester.

14. A molded product formed of the polyester of claim 1.

* * * * *